(12) United States Patent
Oehrlein

(10) Patent No.: US 7,508,406 B2
(45) Date of Patent: Mar. 24, 2009

(54) GLAZING COMPRISING BREAK LINES

(75) Inventor: Alexander Oehrlein, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 470 days.

(21) Appl. No.: 10/544,481

(22) PCT Filed: Feb. 11, 2004

(86) PCT No.: PCT/FR2004/000304

§ 371 (c)(1), (2), (4) Date: Jan. 6, 2006

(87) PCT Pub. No.: WO2004/074193

PCT Pub. Date: Sep. 2, 2004

(65) Prior Publication Data

US 2006/0138798 A1   Jun. 29, 2006

(30) Foreign Application Priority Data

Feb. 12, 2003  (DE) .................................. 103 05 733

(51) Int. Cl.
*B41J 2/435* (2006.01)
*B60J 1/00* (2006.01)

(52) U.S. Cl. .......................... 347/224; 296/84.1; 65/112

(58) Field of Classification Search ................ 296/84.1, 296/187.03, 187.04, 96.21; 248/43; 347/224; 65/112, 111

See application file for complete search history.

(56) References Cited

U.S. PATENT DOCUMENTS 6,501,499 B2 * 12/2002 Hayashi ...................... 347/224
2001/0028390 A1    10/2001 Hayashi

FOREIGN PATENT DOCUMENTS

DE          199 57 317        6/2001

* cited by examiner

*Primary Examiner*—Joseph D Pape
(74) *Attorney, Agent, or Firm*—Oblon, Spivak, McClelland, Maier & Neustadt, P.C.

(57) ABSTRACT

A window including deliberate rupture zones. The window is obtained by a method whereby the glass is subjected to local overheating of the structure using a high-energy beam penetrating the glass, deliberate rupture zones are produced by sequentially guiding the beam in a predetermined path along the preferred path for the window to break along, and by sequentially focusing the beam both along the predetermined path and at various depths relative to the surface of the window. The sequential focusing at various penetration depths follows a line that is inclined and/or curved relative to the normal to the surface of the glass so that a weakened structure is created in the window to obtain rupture behavior of the window that differs according to the direction in which the influence leading to rupture acts.

17 Claims, 2 Drawing Sheets

GLAZING COMPRISING BREAK LINES

CROSS-REFERENCE TO RELATED APPLICATIONS

The present application is the U.S. counterpart of WO 2004/074193, and in turn claims priority to German Application Number 103 05 733.1, filed on Feb. 12, 2003, the entire contents of each of which are hereby incorporated herein by reference.

BACKGROUND OF THE INVENTION

The invention relates to a method for producing deliberate rupture zones in windows, exhibiting the characteristics of the preamble of claim 1.

The anterior German patent application 102 25 555.5-21 describes laminated windows with deliberate rupture zones to be used in vehicles (as windshields or roof glass). In an impact with a pedestrian, a cyclist, etc., involved in a collision with the vehicle, the laminated glass yields markedly more easily under the impact than conventional laminated windows, which means that the intensity of the impact is greatly lessened and the risks of injury are minimized.

In the aforesaid patent application, numerous well-known possible ways of producing such deliberate rupture zones are discussed; reference is made here to these considerations.

According to the anterior application, weakening of the window is preferably produced by creating a locally limited stress gradient, that is to say a heterogeneous stress in the glass, which stress diminishes in a targeted and locally limited fashion the rupture strength of the glass. The stress gradient is present both in the thickness of the glass and on the surface of the glass. Under load, due, for example, to a curvature of the glass, and exceeding a determined level, the strength is exceeded in the zone of the stress gradient, and the window breaks.

A locally limited stress gradient can be created by local heating of the window above its transformation point, followed by rapid cooling. This thermal prestressing method is widespread, but in the known methods, the entire window is heated and quenched homogeneously. The local heating may be performed, for example, using a laser or a gas flame.

The website "http://www.vitro.de" describes a method whereby visible space structures, for example portraits of people, are produced in glass bodies by means of a computer-controlled laser device and a robot. Evidently, a modification to the structure is brought about by overheating by appropriate focusing of the laser radiation at determined penetration depths.

DE 199 57 317 teaches rupture lines that are perpendicular relative to the window glass, which is unable to offer behavior that differs according to which face is stressed by the impact.

The problem underlying the invention is that of proposing another method, whereby it is possible to create, in a window, local modifications to the structure that encourage the latter to rupture in the event of overload, with a behavior that differs according to which face of the window is stressed.

According to the invention, this problem is solved with the characteristics of claim 1. The characteristics of the dependent claims indicate advantageous improvements to the invention.

A method such as the method mentioned above, designed for decorations and reproductions, in order locally to destructure the body of glass using a beam of high-energy radiation that can be focused at various penetration depths under the control of a program, particularly a laser beam, can be used according to the invention to manufacture deliberate rupture zones in windows. In a particularly advantageous way, the progress of the rupture can in this instance be predetermined very precisely by forming microcracks within the mass of the glass, in a way somewhat comparable with a perforation. However, this destructuring does not necessarily have to affect the surface of the window, as would be the case for example with the well-known scorings. By contrast, the method according to the invention makes it possible to bring about internal weakening of the window or windows at an appropriate, and varying, distance from the two surfaces.

One customary method for producing these microcracks is to focus laser pulses in the transparent material. However, it might also be possible to conceive of overheating only by continuous irradiation (continuous-wave laser operation) to produce stress cracks. In the region of the focal point, either there is overheating due to residual absorption of the glass at the wavelength of the laser used, or the bonds in the glass are broken by a photochemical effect, by the absorption of several photons at once (multiple photon absorption), or parts of the glass matrix are ionized and then shatter.

By focusing a laser that has a wavelength of, for example, 1064 nm or 532 nm (typical values in the infrared range [Nd:YAG laser] and in the visible range), the glass is suddenly locally destroyed in a zone measuring from a few microns to less than 100 microns, which means that microcracks remain in the glass, along which microcrack the glass breaks when it subsequently experiences an impact.

If a focused laser beam is now run along the glass at a speed such that the focal points of the individual pulses are positioned separately in the glass, it is then possible as follows to describe the appearance of such an individual microdamage point:

Given that the rough structure of such a cracking point is generally analogous to an image of the distribution of the intensity at the focal point (the material has been displaced, destroyed or transformed where the intensity of the laser was still strong enough), such a microdamage point can be visualized in a form similar to a hyperbola rotating about the ordinate axis (similar to an hourglass). This appearance stems from the fact that a focused homogeneous laser beam generally has a minimum thickness stricture (the diameter of a laser beam focused at the narrowest point is always finite), similar to the narrow passage between the two halves of an hourglass.

The spatial arrangement of the weakened or lower-strength zones in the body of glass and their size and/or their dimensions may thus be defined very precisely. It is also furthermore possible to set out in a targeted way a path for the weakened zone in the thickness of the glass. Admittedly, the weakened or less strong zone may penetrate depthwise perpendicular to the surface. This is not, however, absolutely essential. On the contrary, the application of technologies and devices that are known per se means that a complex weakening path can be realized through the thickness of the window. In particular, it is possible to create a kind of weakened structure, generally in the shape of a cone (or of a wedge), with which the rupture behavior differs according to the direction in which the influence leading to rupture acts. The term cone must not be interpreted in its precise geometric meaning (although such a meaning is not precluded). It means that the lines of weakness through the edge face of the window glass diverge around the perimeter of the window glass. In particular, as the window glass generally has four main sides, it can be said that the lines are essentially divergent in pairs, that is to say that there are two groups of two lines of weakness, each line of each group being placed on the other side of the window glass from the other line of the same group and diverging therefrom in the edge face of the window glass. The fact that the lines of weakness are oblique (or inclined) with respect to the normal perpendicular to the window glass gives the window glass an impact behavior that differs according to whether the impact strikes one face or the other of the window glass (generally either the concave face or the convex face). This effect begins in fact even as soon as a line of weakness is at least partially oblique (or inclined) with respect to the edge face of the window glass. It is therefore not absolutely essential for the entirety of the line of weakness to be oblique over the entirety of the perimeter of the window glass.

Thus, the invention relates first and foremost to a method for producing deliberate rupture zones in a window, in which method the structure of the glass is subjected to local overheating using a high-energy beam penetrating the glass, in which deliberate rupture zones (5) are produced by sequentially guiding the beam in a predetermined path (line 3) along the preferred path for the window (1) to break along and by sequentially focusing the beam both along this path (line 3) and at various depths relative to the surface of the window (1), the sequential focusing at various penetration depths following a line that is inclined and/or curved relative to the normal to the surface of the glass so that a weakened structure is created in the window in order to obtain rupture behavior of the window (1) that differs according to the direction in which the influence leading to rupture acts. The definition of the invention which has just been given covers the fact that the weakened line may be curved or inclined only at least partially.

The weakened zones may also be produced not only continuously, but also in the form of broken or dotted lines with interruptions in the manner of perforations, or a distribution of points in three dimensions.

Likewise, it is possible to conceive microcracks only at a determined depth in the window. These steps encourage the creation of the condition whereby a window "weakened" in that way does not break in all cases except when a significant overload is applied.

To influence the subsequent evolution of the rupture, it is also possible to adapt the inclination of an incident laser beam with respect to the shape of the window (that is to say an inclination determined with respect to the normal to the window at the shaping point) so that one direction of cracking, preferably appearing at a given point of microdamage obtained by the focusing of a laser, is superposed with the desired subsequent path of the crack such that these cracks propagate in the desired way when the window subsequently ruptures.

The method may also be applied without difficulty in the case of laminated windows, that is to say before or after the windows are assembled into a finished product. The layer of adhesive between the rigid windows of such a composite product may in this instance be dissociated from the weakening. Thus, sufficient resistance to penetration is maintained for countering attempts at breaking in, in spite of the weakening of the window.

It is for example possible to ensure that this same window, for example a vehicle windshield, is relatively flexible in the event of rupture following impact with a body arriving from the outermost side and for it to collect this body within the meaning of the anterior invention, but for, at the same time, a passenger of the vehicle striking this window from the innermost side of the vehicle to be protected reliably against the risk of being thrown out of the vehicle.

The deliberate rupture zones provided in the glass, or their path, may be visible or non-visible, depending on the energy or power of the high-energy beam. In the case of visible rupture zones, these may, however, if necessary be concealed from sight, in the regions near the edge of the treated windows, by opaque colored surrounds which are in widespread use in vehicle windows.

The damage caused in the glass by the laser may be spread between visible damage and invisible damage.

The visible damage in the glass is produced when the energy of the radiation or the power of the radiation is so high ("radiation above the threshold") that damage, for example microcracks, that is visible (to the naked eye) arises at the point treated by the radiation. In this instance, a determined threshold for the energy and/or the power, which is characteristic of the medium being treated by the radiation (and which may incidentally also be dependent on the earlier history of the treated point) has been exceeded and a crack structure has been created.

We talk of invisible damage in the glass when the energy of the radiation or the power of the radiation is not high enough ("radiation below the threshold") to bring about damage that is visible (not to the naked eye but to the optical microscope), but visible damage is produced by repeated exposure of the same point to "radiation below the threshold", by action of a thermal or mechanical stress ("material fatigue"). To produce invisible rupture zones, use may be made of the technique described in "Statistical study of single and multiple pulse laser-induced damage in glasses", Optics Express, 16 December 16, vol. 10, No. 25, p. 1465. The mechanisms involved here are not yet fully understood, but it is generally thought that damage in the glass occurs in a zone of the glass exposed first at the location of "precursors" (initiators of the point subsequently damaged in the glass). These "precursors" may be defects, impurities, or color centers. It must, however, be noted that it was never the intention of the authors of this article to create any weakness in the support subjected to the radiation.

Obviously the initial damage at issue here needs to be visible at least with a microscope, because it represents characteristics that are important to the safety of the windows concerned, which windows have to meet national homologation procedures and have therefore to be checked by third parties at an acceptable cost.

Other details and advantages of the subject of the invention will stem from the drawings of some embodiments and from the detailed description thereof that follows.

BRIEF DESCRIPTION OF THE DRAWINGS

In these drawings, in simplified depiction.

DETAILED DESCRIPTION OF THE INVENTION

Figure 1:
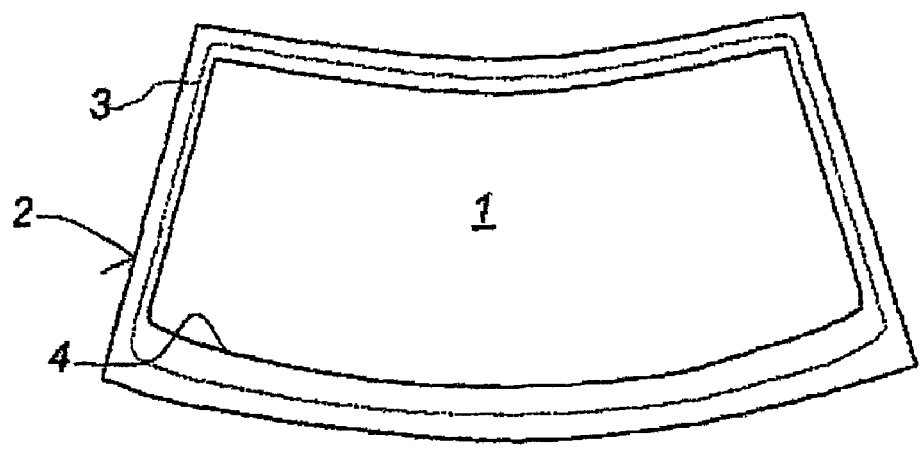
FIG. 1 is a view of a window, along an edge of which a peripheral weakened zone has been produced.

According to FIG. 1, a window 1 produced as a vehicle windshield is provided with a weakened zone 3 running along its outer edge 2 and indicated by a broken line. In the actual window 1, this zone is covered by a strip of opaque colored paint 4, only the interior edge of which can be seen here.

It is explicitly emphasized that this method can naturally be applied also to the fashioning of windows to be used in buildings.

Figure 2:
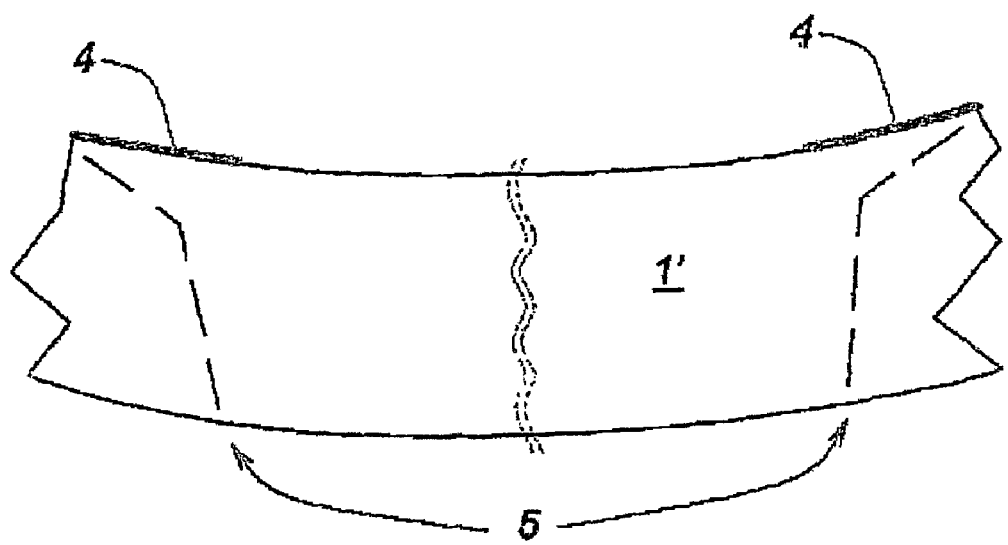
FIG. 2 shows a cross section through a window provided with weakened zones.

FIG. 2 shows that microcracks 5 have been created in two groups arranged one to the right and one to the left of two fine lines shown in chain line, within the mass of the glass of a monolithic window 1' here depicted only in the form of a small fragment. In total, these microcracks may form a peripheral weakened zone 3 of the type illustrated in FIG. 1.

The objective of the invention may, however, also be achieved when there is produced in such a window only at least two weakened zones or weakened lines situated one facing the other, which do not follow a path around the entire periphery of the window, unlike in the depiction of FIG. 1. They may be provided near the edge, for example only along the two short lateral sides or along the two long lateral sides of the window 1, and they then preferably extend as far as the outer edge thereof. They bound between them a region of the surface of the window 1. In a cross section through the window 1 the image visible in FIG. 2 is then more or less obtained.

It can be seen that the microcracks 5 do not affect the surfaces of the glass 1 but that they lie exclusively within the mass of glass.

Furthermore, they are not made continuously but as a broken line interrupted in the manner of a perforation. Even in the longitudinal path of the weakened zone 3, the microcracks do not necessarily have to be continuous.

Finally, FIG. 2 also shows that the microcracks 5 follow, within the thickness of the window, a path that is curved and inclined relative to the respective perpendicular or normal to the surface of the window. The groups of microcracks situated to the right and to the left one facing the other in this instance are directed in opposite directions. In total, there is thus formed between the groups of microcracks a rupture piece (piece of debris) with a rupture outline more or less in the shape of a cone or of a wedge, that is to say having divergent surfaces. These divergent surfaces lie in pairs on each side of the piece (the weakened line 5 to the right and the weakened line 5 to the left diverge). Under the action of a force causing rupture from the concave side of the window 1', rupture behavior is seen that differs from the behavior that corresponds to a force acting from the convex side of the window 1'. In the latter case, the window will be more flexible, whereas in the former case a certain supporting effect may be expected this resulting from the overlap of the rupture edges on each side in the direction of the force. In material terms, the paths of the microcracks and of the weakened zones need naturally to be optimized by testing; the arrangement illustrated here which is not to any scale is to be used only by way of a schematic symbolic illustration.

A rupture reaction that differs according to the direction of action may be obtained when the microcracks are led out to the surface on one of the faces of the window, when they are, however, terminated some distance before they reach the surface in the other face. Quite obviously, this is equivalent to an (at least partial) flaw in the surface concerned and encourages the crack to propagate along and from this pre-damaged surface.

Figure 3:
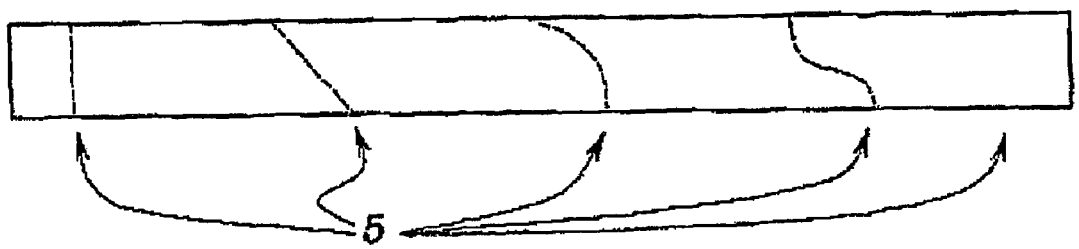
FIG. 3 gives an overview of various possible paths of weakened zones in the thickness of a window.

FIG. 3 also shows an entire series of alternative forms of configurations, in which microcracks 5 may be formed in windows; on the extreme left, there is a straight path perpendicular to the surface of the window, and to the right of this a straight path inclined at about 45° to the surfaces (in this instance, the ends of the cracks extend as far as the surface), followed by two different curved paths. Finally, to the far right, there is depicted a single "microdamage point". A series of such isolated points, particularly ones that are not very visible, to be formed along the path of the line 3 in FIG. 1 may, in some cases, be enough to achieve the desired effect. All these configurations together with numerous other alternative forms may be achieved reproducibly using the laser beam method, at relatively low cost, in a way that can be significantly mechanized and in a short space of time.

Figure 4:
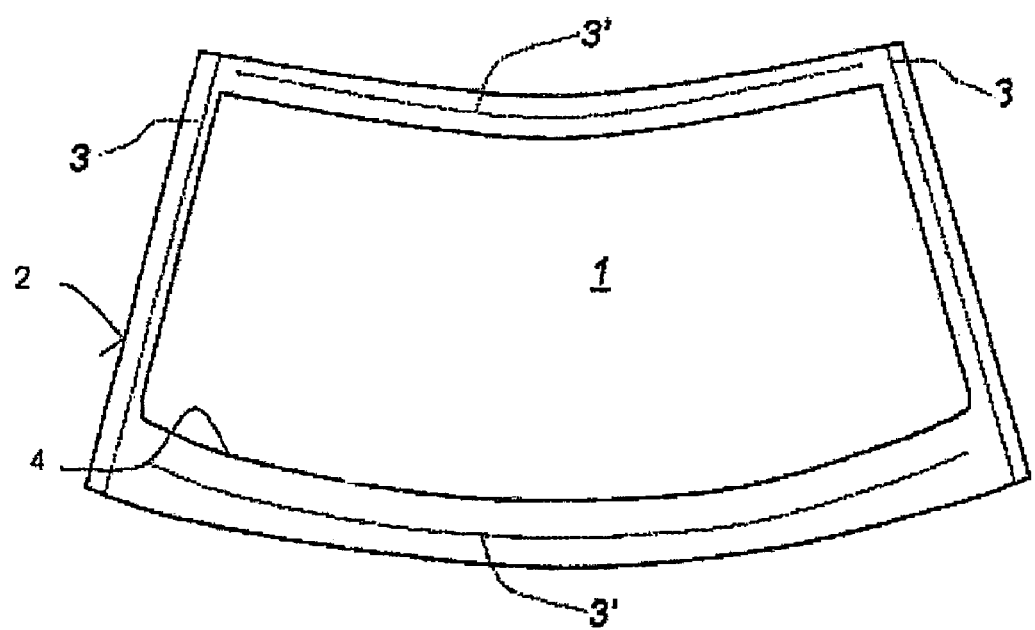
FIG. 4 shows a view of a window, along the edge of which a not entirely peripheral weakened zone has been produced.

FIG. 4 shows a window 1 constituting a vehicle windshield provided with two weakened lines 3 and 3' running along its outer edge 2 and indicated by a dotted line. The two groups of lines 3 and 3' do not meet and this is so as to leave the windshield stronger in the event of an impact. The weakened lines are covered by a band of opaque colored paint 4. The window glass does indeed have two groups of two weakened lines (the group of the two lines 3 on the one hand and the group of the two lines 3' on the other). Within the two groups, each line is oblique through the edge face, that is to say relative to the normal to the window glass at the same point as the line.

The invention claimed is:

1. A method for producing deliberate rupture zones in a window, comprising:
    subjecting a structure of glass to local overheating using a high-energy beam penetrating the glass, in which deliberate rupture zones are produced by sequentially guiding the beam in a predetermined path along a preferred path for the window to break along and by sequentially focusing the beam both along the predetermined path and at various depths relative to the surface of the window,
    wherein the sequential focusing at various penetration depths follows a line that is inclined and/or curved relative to the normal to the surface of the glass so that a weakened structure is created in the window to obtain rupture behavior of the window that differs according to a direction in which the influence leading to rupture acts.

2. The method as claimed in claim 1, wherein the weakened structure is cone-shaped or wedge-shaped.

3. The method as claimed in claim 1, wherein the deliberate rupture zones are produced in at least two lines situated one facing the other and bounding between them a region of the surface of the window.

4. The method as claimed in claim 1, wherein the peripheral weakened structure is formed in total by the deliberate rupture zones.

5. The method as claimed in claim 1, wherein the deliberate rupture zones are arranged continuously or discontinuously along the predetermined path.

6. The method as claimed in claim 1, wherein at least one window built into or to be built into a laminated window pane is provided with deliberate rupture zones.

7. The method as claimed in claim 1, wherein microcracks form the deliberate rupture zones and are created in the mass of the glass without degrading either or both surfaces of the glass.

8. The method as claimed in claim 1, wherein microcracks that open onto at least one surface of the glass are produced.

9. The method as claimed in claim 1, wherein the deliberate rupture zones or the weakened structure of the glass are concealed from sight.

10. The method as claimed in claim 1, wherein the high energy beam is produced by a laser with a wavelength of 1064 nm or 532 nm.

11. The method as claimed in claim 1, wherein the high-energy beam has properties of: an energy or power that is not high enough to produce damage that is visible to the naked eye but that produces, in or on the glass, initial damage, which may evolve into a crack, or also into visible damage in the glass, under further exposure to high-energy radiation or to thermal, chemical or mechanical stress.

12. The method as claimed in claim 1, wherein high-energy or ionizing radiation in or on a material that is at least partially transparent to this type of radiation so as to create deliberate rupture zones, weakened zones or defects leads, as a result of targeted physical or chemical makeup of the local environment of the area to be treated, to focused radiation, to stimulated emission, or to superradiation and therefore leads to a local radiation density that is increased in the region to be treated.

13. A window comprising:
   at least one weakened zone encouraging rupture along a predetermined rupture path if the window is overloaded, which rupture is produced by creation of microcracks using high-energy radiation, using a method as claimed in claim 1,
   in which window the weakened zone, considered in cross section through thickness of the window, has a path that is inclined relative to the normal of the surface of the glass and/or a curved path.

14. The window as claimed in claim 13, wherein the at least one weakened zone is formed of at least two lines bounding between them a region of the surface of the window and continuing as far as edges of the window.

15. The window as claimed in claim 13, wherein the at least one weakened zone describes a peripheral line a distance from an outer edge, such that it results in rupture debris having a rupture outline that is more or less cone-shaped or wedge-shaped.

16. The window as claimed in claim 13, wherein the at least one weakened zone includes microcracks opening onto at least one face to produce a preferred rupture reaction.

17. The use of a window of claim 13 as a curved windshield in a motor vehicle, in which weakened zones situated one facing the other are directed in opposite directions and diverge from a convex face to a concave face of the window such that the window is relatively flexible in an event of rupture following impact with a body arriving from an outermost side.

* * * * *